United States Patent

Otaki

[11] Patent Number: 5,847,866
[45] Date of Patent: Dec. 8, 1998

[54] LENS-BARREL OPTICAL SYSTEM AND MICROSCOPE APPARATUS

[75] Inventor: Tatsuro Otaki, Tokyo, Japan

[73] Assignee: Nikon Corporation, Tokyo, Japan

[21] Appl. No.: 694,294

[22] Filed: Aug. 8, 1996

[30] Foreign Application Priority Data

Aug. 8, 1995 [JP] Japan .................................. 7-222679

[51] Int. Cl.$^6$ .......................... G02B 21/00; G02B 21/36; G02B 23/00; G02B 5/08
[52] U.S. Cl. ........................ 359/368; 359/363; 359/384; 359/434; 359/861
[58] Field of Search ..................... 359/368, 379, 359/380, 381, 384, 389, 383, 388, 421, 422, 423, 431, 432, 433, 434, 858, 861

[56] References Cited

U.S. PATENT DOCUMENTS

| | | | |
|---|---|---|---|
| 3,945,713 | 3/1976 | Doi et al. | 359/423 |
| 4,299,439 | 11/1981 | Strömblad | 359/384 |
| 4,527,869 | 7/1985 | Nihoshi | 359/363 |
| 4,691,997 | 9/1987 | Muchel | 359/364 |
| 5,146,363 | 9/1992 | Nagano | 359/363 |
| 5,239,171 | 8/1993 | Takabayashi et al. | 250/205 |
| 5,557,456 | 9/1996 | Garner et al. | 359/393 |

FOREIGN PATENT DOCUMENTS

58-214121  12/1983  Japan .
0138314  6/1988  Japan ..................................... 359/368

*Primary Examiner*—Thong Nguyen
*Assistant Examiner*—Mark A. Robinson
*Attorney, Agent, or Firm*—Foley & Lardner

[57] ABSTRACT

A microscope apparatus having an objective optical system for condensing a beam emitted from a sample to form an intermediate image; a lens-barrel optical system for focusing a beam from the intermediate image to form an observation image; and an eyepiece optical system for enlarging and projecting a beam from the observation image; wherein the lens-barrel optical system includes a relay lens system for focusing a beam from the intermediate image formed by the objective optical system to form the observation image and guiding a beam from the observation image to the eyepiece optical system; and a beam rotating unit having a plurality of reflecting members three-dimensionally arranged in an optical path between the objective optical system and the observation image, wherein the plurality of reflecting members successively reflect the beam from the objective optical system to invert the beam about an optical axis of the relay lens system, thereby forming the observation image in the form of an inverted image. This arrangement permits the lens-barrel optical system to form the inverted observation image as focusing the beam from the inverted intermediate image in the compact, easy, and cheap structure.

23 Claims, 6 Drawing Sheets

LENS-BARREL OPTICAL SYSTEM AND MICROSCOPE APPARATUS

BACKGROUND OF THE INVENTION

1. Field of the Invention

The present invention relates to a lens-barrel optical system for guiding an image of a sample incident from an objective optical system to an eyepiece optical system and a microscope apparatus equipped with the lens-barrel optical system so as to enable an observer to observe an inverted image of the sample.

2. Related Background Art

Ordinary biological microscopes are arranged for the observer to observe inverted images of such samples as various biological tissues as enlarging microscopic structure or optical characteristics thereof. The prior art concerning such microscope apparatus is described in detail, for example, in Japanese Laid-open Patent Application No. 58-214121 (U.S. Pat. No. 4,527,869).

SUMMARY OF THE INVENTION

An object of the present invention is to provide a lens-barrel optical system arranged in compact, easy, and cheap structure to focus a beam from an intermediate image to form an observation image as an inverted image.

A further object of the present invention is to provide a microscope apparatus equipped with such a lens-barrel optical system and arranged in compact, easy, and cheap structure to enable the observer observe the inverted image of the sample.

In order to achieve the above objects, a lens-barrel optical system of the present invention comprises: (i) a relay lens system for focusing a beam from an intermediate image formed by an objective optical system to form an observation image and guiding a beam from the observation image to an eyepiece optical system; and (ii) a beam rotating unit having a plurality of reflecting members three-dimensionally arranged in an optical path between the objective optical system and the observation image, the plurality of reflecting members successively reflecting the beam from the objective optical system to invert the beam about an optical axis of the relay lens system, thereby forming the observation image in the form of an inverted image.

In the lens-barrel optical system of the present invention, the beam rotating unit preferably comprises: (a) a first reflecting member for reflecting a beam incident thereto along a predetermined first axis from the objective optical system, along a predetermined reference plane substantially perpendicular to the first axis; (b) a second reflecting member for reflecting a beam incident thereto from the first reflecting member, along the reference plane; and (c) a third reflecting member for reflecting a beam incident thereto from the second reflecting member, along a second axis substantially parallel to the first axis so as to let the beam reflected advance in a direction coincident with a direction of incidence to the first reflecting member; wherein three reflection center points, which are intersecting points between reflecting surfaces of the first to third reflecting members and a principal ray of the beam successively incident thereto from the objective optical system, compose vertices of an isosceles triangle with the base on a line segment connecting the reflection center points of the first and third reflecting members, in the reference plane.

The lens-barrel optical system of the present invention preferably further comprises: a light splitting unit disposed to split a beam incident from the objective lens system into two beams, the light splitting unit forming an observing intermediate image as the intermediate image, based on one of the two beams thus split, and a photographing intermediate image, based on the other beam; and a reticle disposed near a forming position of the observing intermediate image to add photographing information of the photographing intermediate image to the observation image.

Moreover, the lens-barrel optical system of the present invention preferably further comprises: a reflecting mirror for reflecting a beam incident thereto from the beam rotating means to guide the beam to the eyepiece optical system; and a swing arm mechanism for variably setting a depression angle of an optical-axis direction of the eyepiece optical system and a depression angle of a surface direction of the reflecting mirror in correspondence to each other. In this case, the lens-barrel optical system of the present invention desirably further comprises: a binocular splitting prism for splitting a beam incident thereto from the reflecting mirror into two beams parallel to each other to guide the two beams to the eyepiece optical system.

Next, a microscope apparatus of the present invention comprises: (1) an objective optical system for condensing a beam emitted from a sample to form an intermediate image; (2) a lens-barrel optical system for focusing a beam from the intermediate image to form an observation image; and (3) an eyepiece optical system for enlarging and projecting a beam from the observation image so as to be observable as an image of the sample; wherein the lens-barrel optical system comprises: (i) a relay lens system for focusing a beam from the intermediate image formed by the objective optical system to form the observation image and guiding a beam from the observation image to the eyepiece optical system; and (ii) a beam rotating unit having a plurality of reflecting members three-dimensionally arranged in an optical path between the objective optical system and the observation image, the plurality of reflecting members successively reflecting the beam from the objective optical system to invert the beam about an optical axis of the relay lens system, thereby forming the observation image in the form of an inverted image.

In the microscope apparatus of the present invention, the beam rotating unit preferably comprises: (a) a first reflecting member for reflecting a beam incident thereto along a predetermined first axis from the objective optical system, along a predetermined reference plane substantially perpendicular to the first axis; (b) a second reflecting member for reflecting a beam incident thereto from the first reflecting member, along the reference plane; and (c) a third reflecting member for reflecting a beam incident thereto from the second reflecting member, along a second axis substantially parallel to the first axis so as to let the beam reflected advance in a direction coincident with a direction of incidence to the first reflecting member; wherein three reflection center points, which are intersecting points between reflecting surfaces of the first to third reflecting members and a principal ray of the beam successively incident thereto from the objective optical system, compose vertices of an isosceles triangle with the base on a line segment connecting the reflection center points of the first and third reflecting members, in the reference plane.

In the microscope apparatus of the present invention, the lens-barrel optical system preferably further comprises: a light splitting unit disposed to split a beam incident from the objective lens system into two beams, the light splitting unit forming an observing intermediate image as the intermediate image, based on one of the two beams thus split, and a photographing intermediate image, based on the other beam; and a reticle disposed near a forming position of the observing inverted intermediate image to add photographing information of the photographing intermediate image to the observation image. In this case, the microscope apparatus of the present invention desirably further comprises an image pickup device for condensing a beam from the photographing intermediate image to pick up an image. In the microscope apparatus of the present invention, the image pickup device is more desirably a photographing camera for picking up the image of the sample in the form of a still image or a video camera for picking up the image of the sample in the form of a dynamic image.

In the microscope apparatus of the present invention, the lens-barrel optical system preferably further comprises: a reflecting mirror for reflecting a beam incident thereto from the beam rotating means to guide the beam to the eyepiece optical system; and a swing arm mechanism for variably setting a depression angle of an optical-axis direction of the eyepiece optical system and a depression angle of a surface direction of the reflecting mirror in correspondence to each other. In this case, in the microscope apparatus of the present invention, the lens-barrel optical system desirably further comprises: a binocular splitting prism for splitting a beam incident thereto from the reflecting mirror into two beams parallel to each other to guide the two beams to the eyepiece optical system.

The microscope apparatus of the present invention preferably further comprises an illumination optical system for illuminating the sample with illumination light. In this case, in the microscope apparatus of the present invention, the illumination optical system desirably comprises: a light source for generating the illumination light; and a beam splitter for guiding the illumination light incident thereto from the light source to the objective optical system and guiding a beam reflected by the sample and incident thereto by way of the objective optical system to the lens-barrel optical system. Also, in this case, in the microscope apparatus of the present invention, the illumination optical system desirably comprises: a light source for generating the illumination light; and a condenser optical system for guiding the illumination light incident thereto from the light source to the object to make the objective optical system guide a beam transmitted through the sample to the lens-barrel optical system.

Moreover, the microscope apparatus of the present invention preferably further comprises: a stage for holding the sample; and a driving motor for moving the stage, thereby adjusting a relative positional relation between the sample and the lens-barrel optical system.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

The structure and operation of one embodiment associated with the lens-barrel optical system and the microscope apparatus according to the present invention will be explained in detail with reference to FIG. 1 to FIG. 6. It is noted here that in the description of the drawings same elements will be denoted by same reference numerals and redundant description will be omitted. Further, dimensional ratios in the drawings do not always coincide with those in the description.

Figure 1:
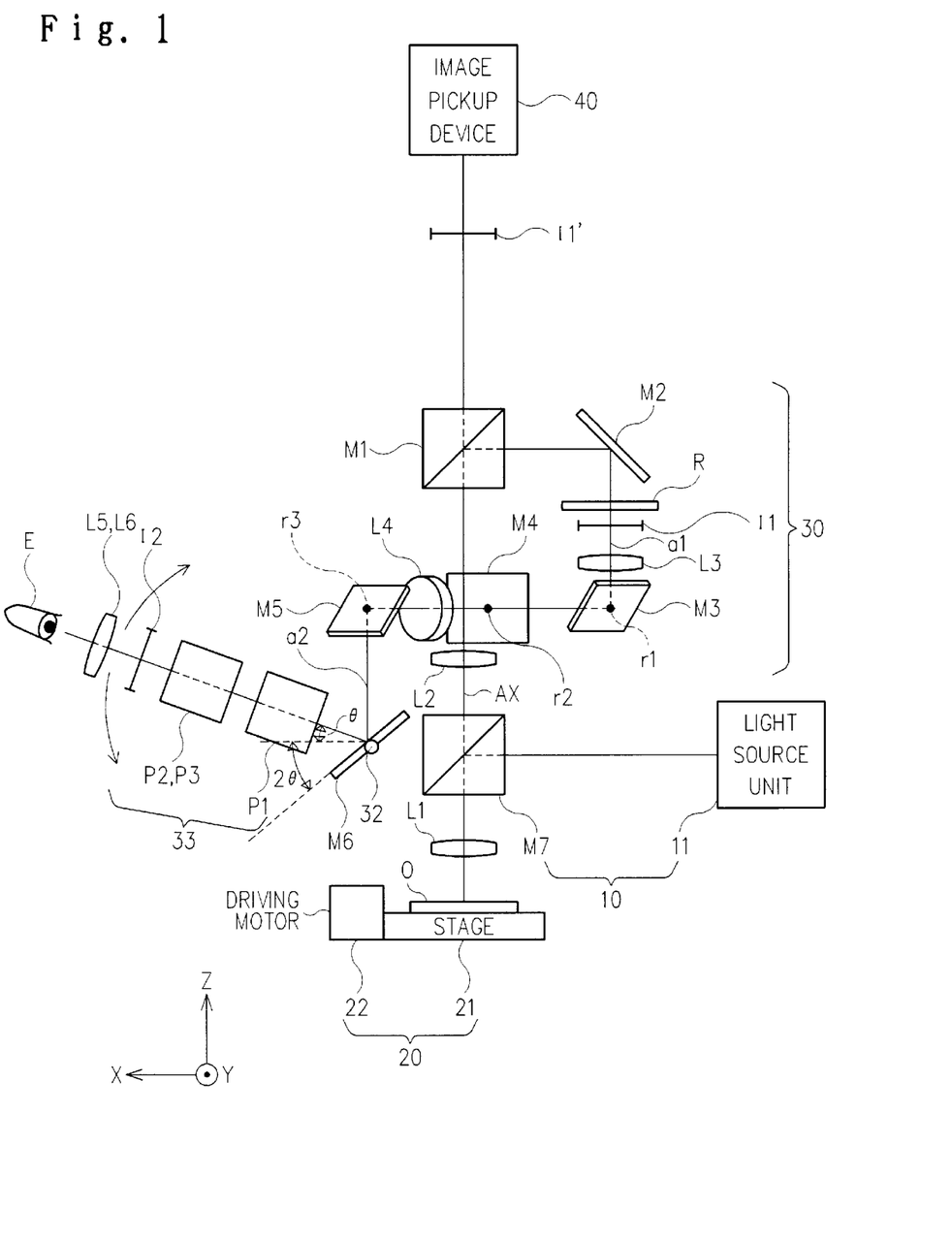
FIG. 1 is a schematic drawing, taken along a plane including the optical axis of the objective optical system, to show the entire structure of an embodiment associated with the microscope apparatus of the present invention.
Figure 2:
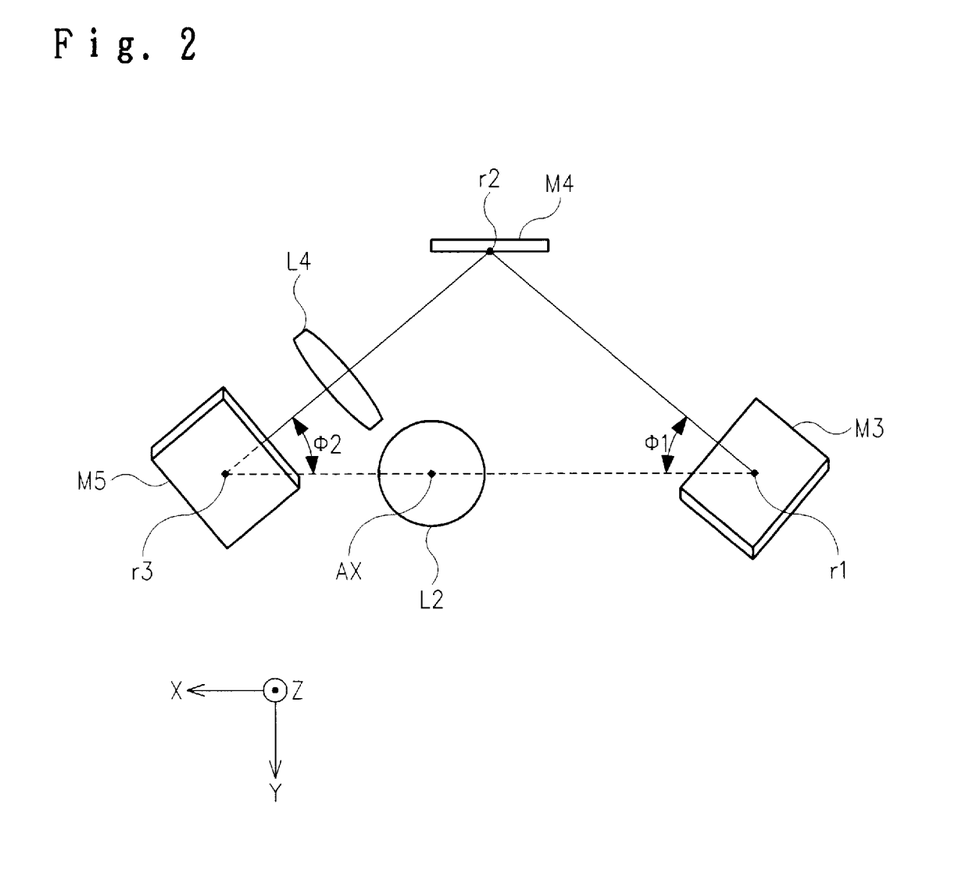
FIG. 2 is a drawing, taken along a plane perpendicular to the optical axis of the objective optical system, to show the partial structure of the lens-barrel optical system in the microscope apparatus of FIG. 1.

FIG. 1 and FIG. 2 are drawings to schematically show the structure of the microscope according to one embodiment of the present invention. Particularly, FIG. 1 shows the entire structure along a plane including the optical axis AX of a first objective lens L1. FIG. 2 shows the arrangement of three mirrors M3–M5 in the plane perpendicular to the optical axis AX of the objective lens L1.

In the microscope apparatus of the present embodiment, as shown in FIG. 1, an illumination optical system 10 vertically and downwardly illuminates a sample O through the first objective lens L1 (objective optical system). Light reflected by the sample O is condensed by the first objective lens L1 to become parallel light by infinity correction and to enter a lens-barrel optical system 30 including a second objective lens L2.

The illumination optical system 10 is composed of a light source unit 11 for generating illumination light and a beam splitter M7 located in an optical path between the first and second objective lenses L1, L2. This beam splitter M7 reflects the light from the light source unit 11 to guide it to the first objective lens L1 and transmits the light from the first objective lens L1 to guide it to the second objective lens L2. The sample O is either one of industrial products and biological tissues, which is held as movable in the horizontal XY plane in the drawing by a stage mechanism 20. In the stage mechanism 20, the sample O is fixed on the surface of the stage 21 and the stage 21 is moved by a driving motor 22 so as to adjust a relative positional relation between the sample O and the stage 21.

In the lens-barrel optical system 30 the light passing through the first objective lens L1 is converged by the second objective lens L2 and is split into two after entering a beam splitter (light splitting means) M1. Each of the two beam splitters M1, M7 is made by cementing two rectangular prisms with a semi-permeable membrane sandwiched between their slant faces.

The light transmitted by the beam splitter M1 travels in the +Z direction, which is vertical in the drawing, to form an inverted intermediate image I1' for photography. The inverted intermediate image I1' for photography is received by a photographing device 40 to be taken as a still image or as a dynamic image. The image pickup device 40 is a photographic camera for taking the image of the sample O as a still image or a video camera for taking the image of the sample O as a dynamic image.

Figure 3:
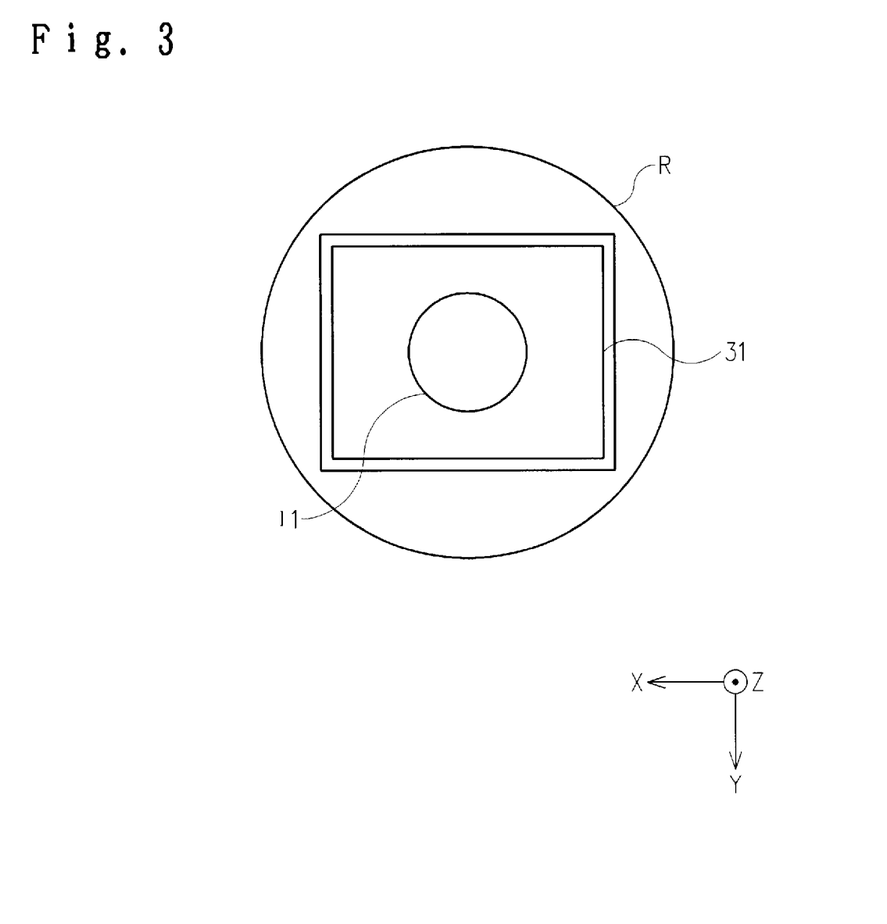
FIG. 3 is a schematic drawing to show the structure of a reticle used as an image pickup field in the microscope apparatus of FIG. 1.
Figure 4A:
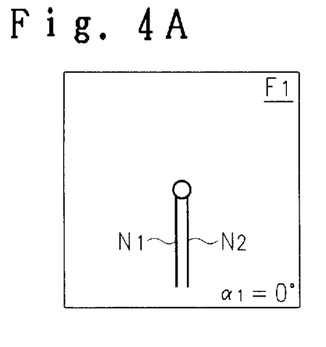
FIG. 4A to FIG. 4F are drawings each of which shows an angle between the normal lines to two reflecting surfaces, projected onto a plane perpendicular to the optical axis of the beam exited from a front reflecting member to a rear reflecting member, as to a set of the two reflecting members adjacent to each other in the lens-barrel optical system in the microscope apparatus of FIG. 1.
Figure 4B:
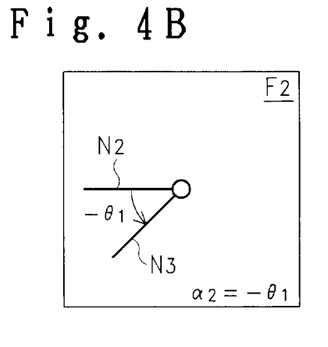
Figure 4C:
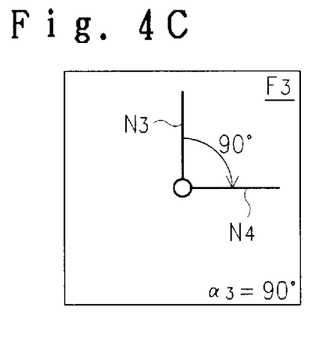
Figure 4D:
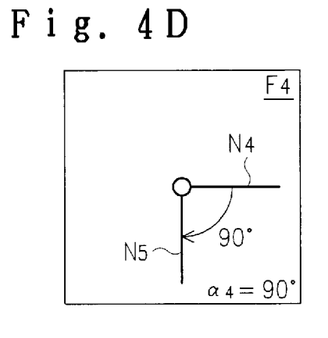
Figure 4E:
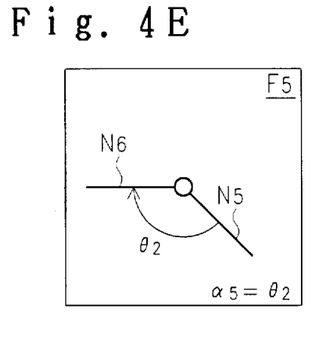
Figure 4F:
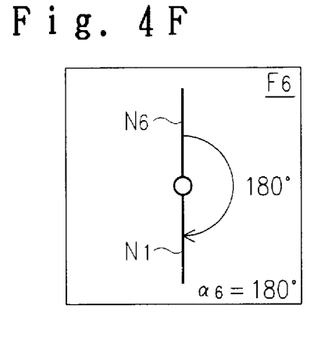

The light reflected in the −X direction, which is horizontal in the drawing, by the beam splitter M1 is reflected by a mirror M2 in the −Z direction, which is vertical in the drawing, thereby forming an inverted intermediate image I1. A reticle R indicating a photographing range for picture or video photography is detachably arranged near the forming position of the inverted intermediate image I1. As shown in FIG. 3, a field frame 31 is formed in the exit-side surface of the disk reticle R as superimposed on the inverted intermediate image I1.

As shown in FIG. 1, light from the inverted intermediate image I1 is condensed by a relay lens L3 and thereafter is incident along a first axis a1 parallel with the optical axis AX of the first objective lens L1 to the mirror (first reflecting member) M3. As shown in FIG. 2, the light incident to the mirror M3 is reflected along a reference plane being the XY plane perpendicular to the first axis a1 to be incident to the mirror (second reflecting member) M4. The light incident to the mirror M4 is reflected along the same reference plane to be incident to the mirror (third reflecting member) M5. Further, the light to be incident to the mirror M5 is converged by a relay lens 4 and thereafter is reflected in the −Z direction, which is the same as the direction of incidence to the mirror M3, along a second axis a2 parallel to the first axis a1.

As clearly shown in FIG. 2, a reflection center point r1 of the mirror M3, a reflection center point r2 of the mirror M4, and a reflection center point r3 of the mirror M5 compose the vertices of an isosceles triangle within the reference plane perpendicular to the first axis a1 and second axis a2, that is, perpendicular to the optical axis AX of the first objective lens L1. Then, a line segment connecting the reflection center point r1 of the mirror M3 with the reflection center point r3 of the mirror M5 corresponds to the base of the isosceles triangle. The reflection center points r1–r3 of the three mirrors M3–M5 are intersecting points of the principal ray of the beam incident in order from the inverted intermediate image I1 with the respective reflecting surfaces of the mirrors M3–M5.

Here is described the reason why the reflection center points r1–r3 of the three mirrors M3–M5 are arranged to compose the vertices of the isosceles triangle in the reference plane. The six reflecting members M1–M6 for circulating the optical path in the lens-barrel optical system 30 need to be positioned so as to satisfy the following equation in order to form an inverted observation image I2 from the inverted intermediate image I1.

$$(\alpha_1+\alpha_3+\alpha_5)-(\alpha_2+\alpha_4+\alpha_6)=360°\times n$$

In the equation, n is an integer. Further, $\alpha_1$ is an angle between the normal line $N_1$ to the reflecting surface of the reflecting member M1 and the normal line $N_2$ to the reflecting surface of the reflecting member M2, when being projected on the plane $F_1$ perpendicular to the reflection optical axis $X_1$ of the reflecting member M1, which is an angle measured clockwise from the normal line $N_1$ to the normal line $N_2$ when seen from the exit side of the optical axis $X_1$ (or when seen as facing to the reflected light from the reflecting member M1). Also, $\alpha_2$ is an angle between the normal line $N_2$ to the reflecting surface of the reflecting member M2 and the normal line $N_3$ to the reflecting surface of the reflecting member M3, when being projected on the plane $F_2$ perpendicular to the reflection optical axis $X_2$ of the reflecting member M2, which is an angle measured clockwise from the normal line $N_2$ to the normal line $N_3$ when observed from the exit side of the optical axis $X_2$ (or when observed as facing to the reflected light from the reflecting member M2).

In the same manner, $\alpha_3$–$\alpha_5$ each are set in order. Further, $\alpha_6$ is an angle between the normal line $N_6$ to the reflecting surface of the reflecting member M6 and the normal line $N_1$ to the reflecting surface of the reflecting member M1, when being projected on the plane $F_6$ perpendicular to the reflection optical axis $X_6$ of the reflecting member M6, which is an angle measured clockwise from the normal line $N_6$ to the normal line $N_1$ when observed from the exit side of the optical axis $X_6$ (or when observed as facing to the reflected light from the reflecting member M6).

As shown in FIG. 4A to FIG. 4F, the normal lines to the reflecting members, projected on the six planes $F_1$ to $F_6$, form six angles $\alpha_1$–$\alpha_6$ in actual. For easiness of description in FIG. 4A to FIG. 4F, the direction of each of the six normal lines $N_1$–$N_6$ is set as a direction extending from each reflection center point of each of the six reflecting members M1–M6 to the light entrance and exit space side, and the reflection center point of each reflecting member is illustrated as overlaid on a white circle and only a normal line extending from the reflection center point of each reflecting member is illustrated.

At this time, the six angles $\alpha_1$–$\alpha_6$ are set as follows.

$\alpha_1=0°$  $\alpha_2=-\theta_1$
$\alpha_3=90°$  $\alpha_4=90°$
$\alpha_5=\theta_2$  $\alpha_6=180°$ Substituting these six angles $\alpha_1$–$\alpha_6$ into the above equation to be satisfied by the six reflecting members M1–M6, the following equation results.

$$\theta_1+\theta_2=180°+360°\times(n-1)$$

The plane $F_2$ is parallel to the reference plane on which the reflection center points r1–r3 of the three mirrors M3–M5 are placed. A line segment $\overline{r1r3}$ connecting the two reflection center points r1, r3 in the reference plane is parallel to a projection of the normal line $N_2$ on the plane $F_2$ and a line segment $\overline{r1r2}$ connecting the two reflection center points r1, r2 in the reference plane is parallel to a projection of the normal line $N_3$ on the plane $F_2$. Therefore, an angle between the two line segments $\overline{r1r3}$, $\overline{r1r2}$ in the reference plane is coincident with the angle $\theta_1$.

The plane $F_5$ is parallel to the reference plane on which the reflection center points r1–r3 of the three mirrors M3–M5 are placed. The line segment $\overline{r1r3}$ connecting the two reflection center points r1, r3 in the reference plane is parallel to a projection of the normal line $N_6$ on the plane $F_5$, and a line segment $\overline{r2r3}$ connecting the two reflection center points r2, r3 in the reference plane is parallel to a projection of the normal line $N_5$ on the plane $F_5$. Therefore, an angle $\phi_2$ between the two line segments $\overline{r1r3}$, $\overline{r2r3}$ in the reference plane is coincident with an angle $(180°-\theta_2)$.

Substantially, $\phi_2=\theta_1$ is achieved because the relation of $\theta_1+\theta_2=180°$ holds. Namely, the angle $\phi_1$ between the two line segments $\overline{r1r3}$, $\overline{r1r2}$ in the reference plane is coincident with the angle $\phi_2$ between the two line segments $\overline{r1r3}$, $\overline{r2r3}$ in the reference plane. Accordingly, the reflection center points r1–r3 of the three mirrors M3–M5 compose the respective vertices of the isosceles triangle with the base on the line segment connecting the reflection center points r1, r3 of the two mirrors M3, M5 in the reference plane.

As described above, the three mirrors M3–M5 are three reflecting members three-dimensionally arranged so as to successively reflect the beam from the inverted intermediate image I1, which compose a beam rotating unit for rotating the beam from the inverted intermediate image I1 by a angle of 180° about the optical axis, that is, for inverting the beam. Further, the two relay lenses L3, L4 compose a relay lens system for forming an observation image I2, based on the beam from the inverted intermediate image I1.

Additionally, the intermediate image I1 may be formed in an optical path between the first mirror M3 and the third mirror M5 when the intermediate image I1 is not the inverted image. Because the physical phenomenon that the intermediate image I1 is not the inverted image is caused by the action of reflection concerning the first mirror M3 or concerning the first and second mirrors M3, M4. Therefore, in case that the intermediate image I1 is not necessarily the inverted image, the three mirrors M3–M5 are preferably disposed an optical path between the second objective lens L2 (objective optical system) and the observation image I2, as the beam rotating unit.

Figure 5:
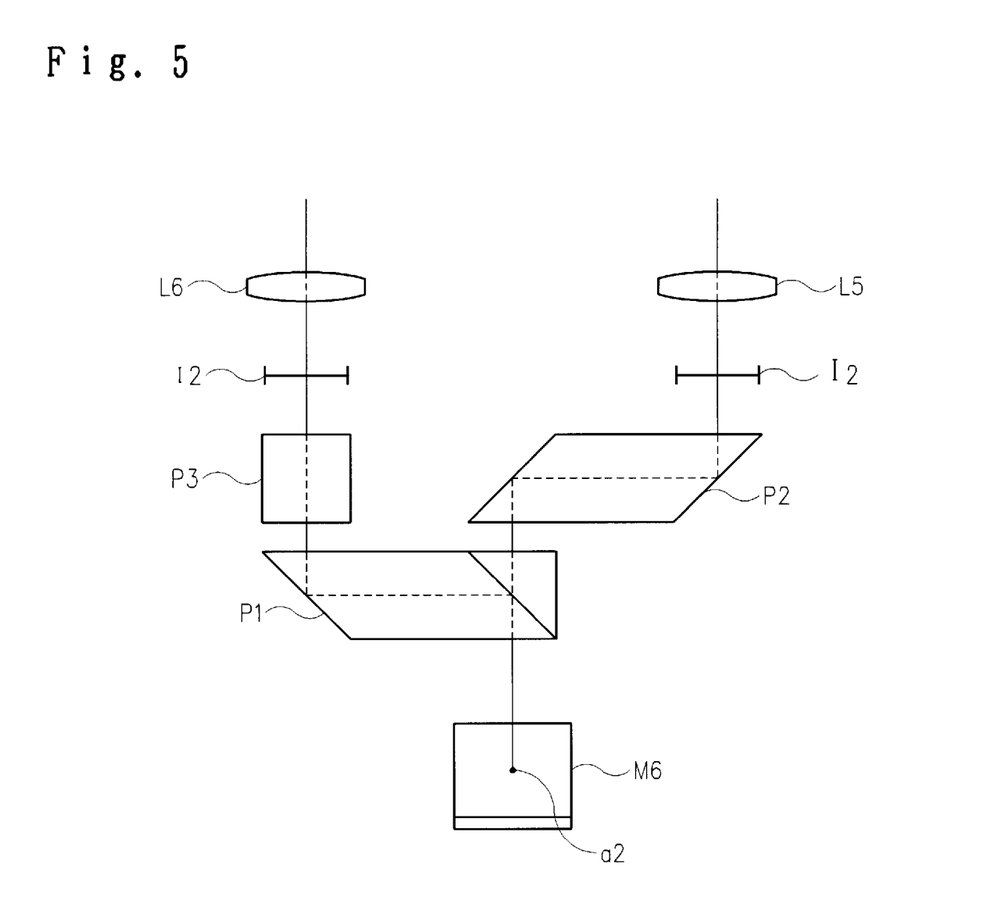
FIG. 5 is a drawing to show the structure of a binocular splitting prism and an eyepiece optical system in the microscope apparatus of FIG. 1.

In the lens-barrel optical system 30, as shown in FIG. 1, the light from the mirror M5 is reflected by the mirror M6, and is split into two beams parallel to each other by the binocular splitting prism 33, thereafter forming two inverted observation images I2. Here, the binocular splitting prism 33 is composed of three prisms P1–P3, as shown in FIG. 5. The prism P1 is made in the form of a frustum by integrally cementing a parallel hexahedron prism with a rectangular prism with a semi-permeable membrane sandwiched between their slant faces, which splits the light incident from the mirror M6 into two beams parallel to each other. The prism P2 is formed in a parallel hexahedron shape, which has two internal slant faces for successively reflecting the light having passed through the semi-permeable membrane of prism P1. The prism P3 is formed in a rectangular parallelepiped shape, which transmits the light reflected by the two internal slant faces of the prism P1.

In this manner, the light emerging from the two prisms P2, P3 forms the two inverted observation images I2 with a same phase. The inverted observation images I2 are enlarged and projected by two eyepiece lenses L5, L6 to be observed by the eyes E of the observer. Here, the two relay lenses L3, L4 secure the optical pathlength necessary for the three mirrors M3–M5 and binocular splitting prism 33 to be positioned, and correct for chromatic aberration caused by the two beam splatters M1, M7 or the binocular splitting prism 33.

In the lens-barrel optical system 30, as shown in FIG. 1, the mirror M6 and binocular splitting prism 33 are arranged as swingable relative to the beam rotating means and relay lens system by means of a swing arm mechanism. The swing arm mechanism tilts the binocular splitting prism 33 integrally in the XZ plane parallel to the plane of the drawing, about a rotation axis 32 extending along the Y-axis direction and set in the mirror M6. In th is case, the depression angle of the optical-axis direction of the binocular splitting prism 33 and the depression angle of the plane direction of the mirror M6 are set to be variable in correspondence to each other.

If an inclination of the mirror M6 relative to the XY plane horizontal in the drawing is $\theta$, the binocular splitting prism 33 is arranged as integrally tiltable by an inclination $2\theta$ relative to the XY plane in the XZ plane. Since the two eyepiece lenses L5, L6 are mounted so as to be integrally tiltable with the binocular splitting prism 33, the observer can observe the observation images by the both eyes E at a desired observation angle by integrally tilting the binocular splitting prism 33 and the two eyepiece lenses L5, L6 by an angle which is a double of a predetermined angle of the mirror M6.

The microscope apparatus of the present embodiment is arranged to obtain the observation images as inverted images by inverting the beam from the inverted intermediate image I1 about the optical axis of the relay lens system by the beam rotating means consisting of the three reflecting members M3–M5 three-dimensionally arranged so as to successively reflect the beam from the inverted intermediate image I1. Consequently, the observation images, observed by the observer's eyes E through the two eyepiece lenses L5, L6, are not erect images, and therefore, the observer can observe the inverted images of the sample with respect to the observation directions with which the observer is accustomed in the ordinary biological microscopes.

Since in the microscope apparatus of the present embodiment the space near the five mirrors M2–M6 can be secured relatively wide, it is not necessary to adjust the forming position of the intermediate image I1 by interposing a relay lens between the beam splitter M1 and the mirror M2 in order to avoid superposition of an image of dust on the reflecting surface of the mirror M1 over the intermediate image I1. It is thus easy to make the magnification of the intermediate image I1 coincident with the magnification of the observation images I2 and it is also easy to prevent a problem from occurring in the incident beam or the reflected beam near the five mirrors M2–M6.

Therefore, the photographing range or the like can be checked through the two eyepiece lenses L5, L6 with necessity in such an arrangement-that the reticle R indicating the photographing range or the like of the image I1' in the photographing system comprised of the image pickup device 40 is located near the forming position of the intermediate image I1.

The photographing information indicating the photographing range or the like can be recognized through the two eyepiece lenses L5, L6, as described above, and can not be photographed by the photographing system. For this reason, the reticle R located near the intermediate image I1 and is thus excellent in the function as a finder. Without providing each of the two eyepiece lenses L5, L6 with a reticle R the photographing information can be checked by the both eyes by guiding the observation images I2 to the observer's eyes E by the binocular portion composed of the binocular splitting prism 33 and two eyepiece lenses L5, L6, which can decrease fatigue upon observation. Further, when the photographing information is unnecessary, the photographing information of the intermediate image I1' can be readily taken away from the observation field by removing the reticle R out of the optical path without exchanging the two eyepiece lenses L5, L6.

Further, in the microscope apparatus of the present embodiment, the optical path is bent at relatively simple angles by the six mirrors M1–M6 including the beam rotating means in the plane including the optical axis AX of the first objective lens L1 and in the reference plane perpendicular to the optical axis AX of the first objective lens L1. Particularly, positioning adjustment becomes easier for the three mirrors M3–M5 constituting the beam rotating means. Because of it, the many reflecting members can be positioned so as to bend the optical path at typical angles such as 90°. Accordingly, compactification of microscope can be achieved by the structure easy in the positioning adjustment of the reflecting members.

Figure 6:
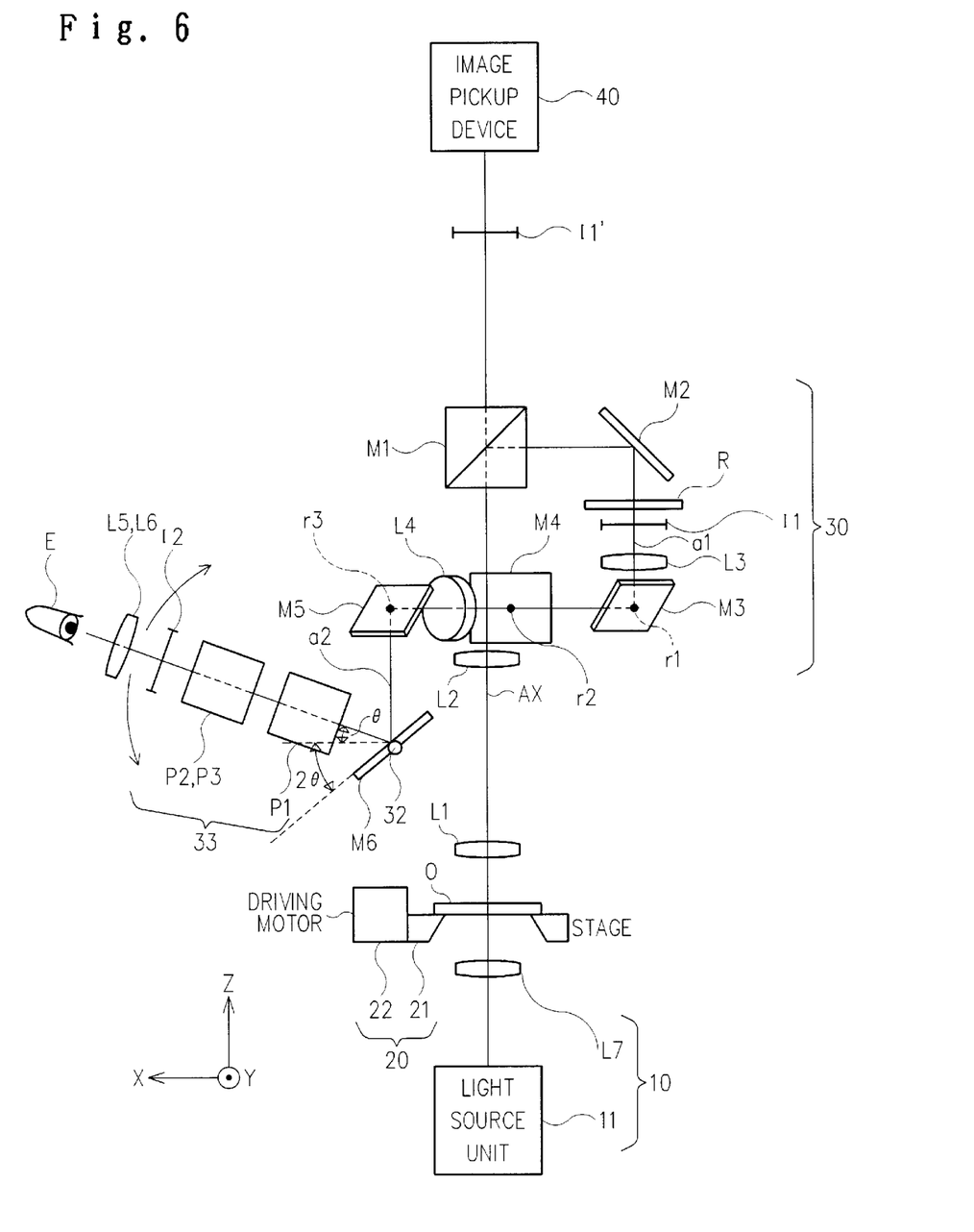
FIG. 6 is a schematic drawing, taken along a plane including the optical axis of the objective optical system, to show the entire structure of a modified example for the microscope apparatus of FIG. 1.

Without being restricted to the foregoing embodiment, the present invention can be subjected to various kinds of modifications. For example, according to the foregoing embodiment, as shown in FIG. 1, the illumination optical system 10 is constituted as a downward illumination type. However, the illumination optical system 10 is constituted as a transmitted illumination type, as shown in FIG. 6.

Namely, the illumination optical system 10 is composed of the light source unit 11 disposed on an opposite side of the first objective lens L1 with respect to the sample O and a condenser lens L7 (condenser optical system) located in an optical path between the light source unit 11 and the sample O. This condenser lens L7 condenses the light from the light source unit 11 to guide it to the sample O. In this case, light transmitted through the sample O is condensed by the first objective lens L1 to enter the lens-barrel optical system 30.

As explained above, the present invention can realize the microscope enabling the observer to observe the inverted image of the sample in the compact, easy, and cheap structure. When the reticle is positioned at the forming position of the intermediate image, the apparatus can be arranged to check the photographing range or the like of the image in the photographing system through the eyepiece lenses as occasion arises. Further, compactification of microscope can be accomplished by the structure easy in the positioning adjustment of the reflecting members.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 222679/1995 filed on Aug. 8, 1995 is hereby incorporated by reference.

What is claimed is:

1. A lens-barrel optical system comprising:
 a relay lens system for focusing a beam from an intermediate image formed by an objective optical system to form an observation image and guiding a beam from said observation image to an eyepiece optical system; and
 a beam rotating unit having a plurality of reflecting members three-dimensionally arranged in an optical path between said objective optical system and said observation image, said plurality of reflecting members successively reflecting the beam from said objective optical system to invert said beam about an optical axis of said relay lens system, thereby forming said observation image in the form of an inverted image, and said beam rotating unit comprising a first reflecting member for reflecting a beam incident thereto along a predetermined first axis from said objective optical system, along a predetermined reference plane substantially perpendicular to said first axis, a second reflecting member for reflecting a beam incident thereto from said first reflecting member, along said reference plane, and a third reflecting member for reflecting a beam incident thereto from said second reflecting member, along a second axis substantially parallel to said first axis so as to let the beam reflected advance in a direction coincident with a direction of incidence to said first reflecting member, wherein three reflection center points, between reflecting surfaces of said first to third reflecting members and a principal ray of the beam successively incident thereto from said objective optical system along said optical axis, compose vertices of an isosceles triangle with the base on a line segment connecting the reflection center points of said first and third reflecting members, in said reference plane.

2. The lens-barrel optical system according to claim 1, further comprising a light splitting unit disposed to split a beam incident from said objective lens system into two beams, said light splitting unit forming an observing intermediate image as the intermediate image, based on one of said two beams thus split, and a photographing intermediate image, based on the other beam, and a reticle disposed near a forming position of an observing inverted intermediate image to add photographing information of said photographing intermediate image to said observation image.

3. The lens-barrel optical system according to claim 1, further comprising a reflecting mirror for reflecting a beam incident from said beam rotating means to guide said beam to said eyepiece optical system, and a swing arm mechanism for variably setting a depression angle of an optical-axis direction of said eyepiece optical system and a depression angle of a surface direction of said reflecting mirror in correspondence to each other.

4. The lens-barrel optical system according to claim 3, further comprising a binocular splitting prism for splitting a beam incident thereto from said reflecting mirror into two beams parallel to each other to guide said two beams to the eyepiece optical system.

5. A microscope apparatus comprising:
 an objective optical system for condensing a beam emitted from a sample to form an intermediate image;
 a lens-barrel optical system for focusing a beam from said intermediate image to form an observation image; and
 an eyepiece optical system for enlarging and projecting a beam from said observation image so as to be observable as an image of said sample;
 wherein said lens-barrel optical system comprises:
  a relay lens system for focusing a beam from said intermediate image formed by said objective optical system to form said observation image and guiding a beam from said observation image to said eyepiece optical system; and
  a beam rotating unit having a plurality of reflecting members three-dimensionally arranged in an optical path between said objective optical system and said observation image, said plurality of reflecting members successively reflecting the beam from said objective optical system to invert said beam about an optical axis of said relay lens system, thereby forming said observation image in the form of an inverted image, and said beam rotating unit comprising a first reflecting member for reflecting a beam incident thereto along a predetermined first axis from said objective optical system, along a predetermined reference plane substantially perpendicular to said first axis, a second reflecting member for reflecting a beam incident thereto from said first reflecting member, along said reference plane, and a third reflecting member for reflecting a beam incident thereto from said second reflecting member, along a second axis substantially parallel to said first axis so as to let the beam reflected advance in a direction coincident with a direction of incidence to said first reflecting member,
 wherein three reflection center points between reflecting surfaces of said first to third reflecting members and a principal ray of the beam successively incident thereto from said objective optical system along said optical axis, compose vertices of an isosceles triangle with the base on a line segment connecting the reflection center points of said first and third reflecting members, in said reference plane.

6. The microscope apparatus according to claim 5, wherein said lens-barrel optical system further comprises a light splitting unit disposed to split a beam incident from said objective lens system into two beams, said light splitting unit forming an observing intermediate image as the intermediate image, based on one of said two beams thus split, and a photographing intermediate image, based on the other beam, and a reticle disposed near a forming position of an observing intermediate image to add photographing information of said photographing intermediate image to said observation image.

7. The microscope apparatus according to claim 6, further comprising an image pickup device disposed to condense a beam from said photographing intermediate image to pick up an image.

8. The microscope apparatus according to claim 7, wherein said image pickup device is a photographing camera for picking up the image of said sample in the form of a still image or a video camera for picking up the image of said sample in the form of a dynamic image.

9. The microscope apparatus according to claim 5, wherein said lens-barrel optical system further comprises a reflecting mirror for reflecting a beam incident thereto from said beam rotating means to guide said beam to said eyepiece optical system, and a swing arm mechanism for variably setting a depression angle of an optical-axis direction of said eyepiece optical system and a depression angle of a surface direction of said reflecting mirror in correspondence to each other.

10. The microscope apparatus according to claim 9, wherein said lens-barrel optical system further comprises a binocular splitting prism for splitting a beam incident thereto from said reflecting mirror into two beams parallel to each other to guide said two beams to the eyepiece optical system.

11. The microscope apparatus according to claim 5, further comprising an illumination optical system for illuminating said sample with illumination light.

12. The microscope apparatus according to claim 11, wherein said illumination optical system comprises a light source for generating said illumination light, and a beam splitter for guiding the illumination light incident thereto from said light source to said objective optical system and guiding a beam reflected by said sample and incident thereto by way of said objective optical system to said lens-barrel optical system.

13. The microscope apparatus according to claim 11, wherein said illumination optical system comprises a light source for generating said illumination light, and a condenser optical system for guiding the illumination light incident thereto from said light source to the object to make said objective optical system guide a beam transmitted through said sample to said lens-barrel optical system.

14. The microscope apparatus according to claim 5, further comprising a stage for holding said sample, and a driving motor for moving said stage, thereby adjusting a relative positional relation between said sample and said lens-barrel optical system.

15. A microscope apparatus comprising:
an objective optical system for converging a light beam from an object to be observed to form an intermediate image of said object;
a relay optical system for converging a light beam from said intermediate image to form an observation image; and
an observation optical system for enabling the observation of said observation image which is formed by said relay optical system, said relay optical system having reflection members located in an optical path between locations at which said intermediate image and said observation image are formed respectively, said reflection members having only an optical function of deflecting light, and said reflection members deflecting a part of an optical axis of said relay optical system along a first plane intersecting a second plane which passes an optical axis of said objective optical system and divides said objective optical system into two;
wherein said reflection members include first, second and third reflection members which deflect a part of said relay optical system along said first plane, and said part of the optical axis of said relay optical system is in the optical path between locations at which said intermediate image and said observation image are formed, respectively, and
wherein three intersecting points between the optical axis of said objective optical system and the reflection surfaces of said first, second and third reflection members compose vertices of an isosceles triangle.

16. A microscope apparatus according to claim 15, wherein said first plane is substantially perpendicular to said second plane.

17. A microscope apparatus comprising:
an objective optical system for converging a light beam from an object to be observed to form an intermediate image of said object;
a relay optical system for converging a light beam from said intermediate image to form an observation image; and
an observation optical system for enabling the observation of said observation image which is formed by said relay optical system;
said relay optical system having reflection members located in an optical path between locations at which said intermediate image and said observation image are formed, respectively, said reflection members having only an optical function of deflecting light, and said reflection members deflecting a part of an optical axis of said relay optical system along a first plane which exists at a position different from that of a second plane which passes an optical axis of said objective optical system and divides said objective optical system into two;
said reflection members include first, second and third reflection members which deflect a part of said relay optical system along said first plane and said part of the optical axis of said relay optical system is in the optical path between locations at which said intermediate image and said observation image are formed, respectively, and
wherein three intersecting points between the optical axis of said objective optical system and the reflection surfaces of said first, second and third reflection members compose vertices of an isosceles triangl.

18. A microscope apparatus comprising:
an imaging optical system for forming an observation image based on a light beam from an object to be observed; and
an observation unit for observation of said observation image formed by said imaging optical system, said imaging optical system comprising:

an objective optical system for converging a light beam from an object to be observed to form an intermediate image of said object;

a relay optical system for converging a light beam from said intermediate image to form an observation image, and an observation optical system for enabling the observation of said observation image which is formed by said relay optical system;

said relay optical system having reflection members located in an optical path between locations at which said intermediate image and said observation image are formed, respectively, said reflection members having only an optical function of deflecting light, and said reflection members deflecting a part of an optical axis of said relay optical system along a first plane intersecting a second plane which Passes an optical axis of said objective optical system and divides said objective optical system into two, and wherein said reflection members include first, second and third reflection members which deflect a part of said relay optical system along said first plane, and said part of the optical axis of said relay optical system is in the optical path between locations at which said intermediate image and said observation image are formed, respectively, and wherein three intersecting points between the optical axis of said objective optical system and the reflection surfaces of said first, second and third reflection members compose vertices of an isosceles triangle.

19. A microscope apparatus according to claim 18, wherein a normal of a reflection surface of at least one reflection member intersects said first plane.

20. A microscope apparatus comprising:

an imaging optical system for forming an observation image based on a light beam from an object to be observed; and an observation unit for observation of said observation image formed by said imaging optical system, said imaging optical system comprising:

an objective optical system for converging a light beam from an object to be observed to form an intermediate image of said object;

a relay optical system for converging a light beam from said intermediate image to form an observation image; and an observation optical system for enabling the observation of said observation image which is formed by said relay optical system;

said relay optical system having reflection members located in an optical path between locations at which said intermediate image and said observation image are formed respectively, said reflection members having only an optical function of deflecting light, and said reflection members deflecting a part of an optical axis of said relay optical system along a first plane which exists at a position different from that of a second plane which passes an optical axis of said objective optical system and divides said objective optical system into two, and wherein said reflection members include first, second and third reflection members which deflect a part of said relay optical system along said first plane, and said part of the optical axis of said relay optical system is in the optical path between locations at which said intermediate image and said observation image are formed, respectively, and wherein three intersecting points between the optical axis of said objective optical system and the reflection surfaces of said first, second and third reflection members compose vertices of an isosceles triangle.

21. A microscope apparatus according to claim 20, wherein a normal of a reflection surface of at least one reflection member intersects said first plane.

22. A lens-barrel optical system comprising:

a relay optical system for converging a light beam from an intermediate image to be formed in an objective optical system to be adapted to said lens-barrel optical system to form an observation image; and reflection members for deflecting an optical axis of said relay optical system, said reflection members deflecting a part of an optical axis of said relay optical system along a first plane which exists at a position different from that of a second plane which passes an optical axis of said objective optical system and divides said objective optical system into two, wherein a normal of a reflection surface of at least one reflection member intersects said first plane, and wherein said reflection members include first, second and third reflection members which deflect a part of said relay optical system along said first plane, and said part of the optical axis of said relay optical system is in the optical path between locations at which said intermediate image and said observation image are formed, respectively, and wherein three intersecting points between the optical axis of said objective optical system and the reflection surfaces of said first, second and third reflection members compose vertices of an isosceles triangle.

23. A lens-barrel optical system comprising:

a relay optical system for converging a light beam from an intermediate image to be formed in an objective optical system to be adapted to said lens-barrel optical system to form an observation image; and reflection members for deflecting an optical axis of said relay optical system, said reflection members deflecting a part of an optical axis of said relay optical system along a first plane intersecting a second plane which passes an optical axis of said objective optical system and divides said objective optical system into two;

wherein a normal of a reflection surface of at least one reflection member intersects said first plane, and wherein said reflection members include first, second and third reflection members which deflect a part of said relay optical system along said first plane and said part of the optical axis of said relay optical system is in the optical path between locations at which said intermediate image and said observation image are formed, respectively, and wherein three intersecting points between the optical axis of said objective optical system and the reflection surfaces of said first, second and third reflection members compose vertices of an isosceles triangle.

* * * * *